United States Patent
Hosgood

(12) 
(10) Patent No.: US 6,291,625 B1
(45) Date of Patent: Sep. 18, 2001

(54) POLYOL COMPOSITIONS FOR POLYURETHANES

(75) Inventor: Henry D. Hosgood, Dorset (GB)

(73) Assignee: Thames Water Services Limited, Reading (GB)

( * ) Notice: Subject to any disclaimer, the term of this patent is extended or adjusted under 35 U.S.C. 154(b) by 0 days.

(21) Appl. No.: 09/117,332

(22) PCT Filed: Jan. 27, 1997

(86) PCT No.: PCT/GB97/00236

§ 371 Date: Jul. 24, 1998

§ 102(e) Date: Jul. 24, 1998

(87) PCT Pub. No.: WO97/27235

PCT Pub. Date: Jul. 31, 1997

(30) Foreign Application Priority Data

Jan. 26, 1996 (GB) .................................................. 9601589

(51) Int. Cl.[7] .................................................. C08G 18/62
(52) U.S. Cl. ........................... 528/74.5; 528/75; 528/84; 554/156
(58) Field of Search ............................... 528/75, 74.5, 84; 554/156

(56) References Cited

U.S. PATENT DOCUMENTS

| | | | |
|---|---|---|---|
| 2,693,480 | * 11/1954 | Haury et al. | 554/156 |
| 3,051,571 | * 8/1962 | Pergament | 554/156 |
| 4,222,927 | * 9/1980 | Walz | 525/444 |

FOREIGN PATENT DOCUMENTS

| | | |
|---|---|---|
| 1170627 | 5/1964 | (DE) . |
| 4117861 A1 | 12/1991 | (DE) . |
| 0145269 A2 | 6/1985 | (EP) . |
| 0161479 A1 | 11/1985 | (EP) . |
| 0344512 A2 | 12/1989 | (EP) . |
| 0568388 A1 | 11/1993 | (EP) . |
| 0672697 A1 | 9/1995 | (EP) . |

\* cited by examiner

*Primary Examiner*—Rachel Gorr

(57) ABSTRACT

A polyol composition for reacting with a polyisocyanate to form a polyurethane resin, comprises: (a) a triglyceride of a $C_{12}$ to $C_{25}$ hydroxy-substituted fatty acid or a $C_{12}$ to $C_{25}$ hydroxy-substituted fatty acid and glycerol, which can react together to produce a triglyceride; and (b) at least 0.1 mole per mole of triglyceride (a) or triglyceride capable of being formed from the fatty acid and the glycerol, of an oxide, hydroxide, or carbonate of a metal from Group IIA of the periodic table. A composition for reacting with a polyisocyanate to form a polyurethane resin, comprises the reaction products of: (a) a triglyceride of a $C_{12}$ to $C_{25}$ hydroxy-substituted fatty acid, a $C_{12}$ to $C_{25}$ hydroxy-substituted fatty acid and glycerol, which can react together to produce a triglyceride: and (b) at least 0.1 mole, per mole of triglyceride (a) or triglyceride capable of being formed from the fatty acid and the glycerol, of an oxide, hydroxide or carbonate of a metal from Group IIA of the periodic table.

12 Claims, No Drawings

POLYOL COMPOSITIONS FOR POLYURETHANES

FIELD OF THE INVENTION

This invention relates to a polyol composition intended to react with a polyisocyanate to form a polyurethane resin.

BACKGROUND OF THE INVENTION

Polyurethanes have a very wide range of applications in surface coatings, protective flooring products, adhesives, sealants and the like to provide protective surfaces with high resistance to aggressive chemicals, physical damage and abrasion. They exhibit very good adhesion to most substrates and can provide long term protection against corrosion and erosion in the most severe of environments. They are generally made by reacting together the components of a two-component composition, one of which includes a polyisocyanate while the other includes a component having two or more hydroxyl groups to react with the polyisocyanate.

It is to be understood that by "a two-component composition" we mean a composition comprising two essential components. Such a composition may additionally comprise one or more other optional components.

Although it is possible to manufacture single component coating systems containing available isocyanate groups, which cure by reaction with atmospheric moisture, such products have limited application because they are invariably solvent-containing, difficult to pigment and unsuitable for situations where a high-build of coating, e.g. 100 microns or more, is required.

For the above reasons, compositions based upon two components, usually polyhydroxy materials and polyisocyanates are preferred. Coatings designed on this basis may contain particulate mineral fillers, pigments and other additives or materials, can be applied as thick films in one application and usually offer improved performance compared with the single component moisture curing products. Because of the vast range of available polyhydroxy compounds (polyols), it is possible to produce a wide range of physical properties in the cured products. Coatings may be designed to be very hard, soft and elastomeric, or any physical character between these.

A problem which arises in making polyurethanes is that the polyisocyanates used react easily with water, for example that contained within the raw materials used, in surfaces to which the polyurethane is to be applied or as atmospheric moisture. As well as reducing the number of isocyanate groups available to react with the polyol, the reaction with water generates carbon dioxide, leading to foaming and incomplete cross-linking. This is particularly damaging in the case of protective films. Steps therefore have to be taken to exclude water from the components, and if the polyurethane is to be applied to a wet surface such as an underground pipe, or damp concrete floor, or in external conditions where surfaces are damp or may encounter rain, unwanted isocyanate reaction will inevitably result.

The inevitability of the reaction between isocyanates and water means that all raw materials for inclusion in conventional compositions must be water-free, or must be dried before or during inclusion and that such compositions are totally unsuitable for use where water is present.

EP-A-0 145 269 discloses two-component compositions which are capable of curing in the presence of water to form polyurethane resins. The compositions comprise highly reactive polyols and solvent-based propolymers with less reactivity than monomeric diisocyanates such as methylene di-p-phenylene isocyanate (MDI) to and toluene isocyanate (TDI). A large excess of water and calcium hydroxide is employed by the compositions to act as a scavenger for carbon dioxide produced. The polyurethane resins formed have limited strength and there are disadvantages, such as flammability and environmental and disposal problems of volatile organic solvents, inherent in the use of solvent-containing materials.

SUMMARY AND OBJECTS OF THE INVENTION

The present invention aims to provide a polyol composition for use as a component of a two-component polyurethane composition which exhibits complete water tolerance, and will even cure under water without any unwanted effects resulting from isocyanate/water reactions.

In the first aspect the present invention provides a polyol composition for reacting with a polyisocyanate isocyanate to form a polyurethane, comprising:

(a) a triglyceride of a saturated or unsaturated $C_{12}$ to $C_{25}$, hydroxy-substituted fatty acid or a $C_{12}$ to $C_{25}$ hydroxy-substituted fatty acid (or Group IIA metal salt thereof) and glycerol, which can react together to produce a triglyceride, and (b) at least 0.1 mole (and preferably up to 2.0 mole), per mole of triglyceride (a) or triglyceride capable of being formed from the fatty acid and the glycerol, of an oxide, hydroxide or carbonate of a metal from Group IIA of the periodic table.

On heating the composition in the presence of water, which may be added or contained as an impurity, the triglyceride is hydrolyzed by the oxide, hydroxide or carbonate thereby breaking the ester bonds to produce free fatty acid and glycerine (glycerol). The fatty acid is then saponified by the oxide, hydroxide or carbonate to produce fatty acid salts of the metal and the oxide, hydroxide or carbonate also reacts with the glycerine to produce metal glycerates.

Accordingly in a second aspect the present invention provides a composition for reacting with a polyisocyanate to form a polyurethane, comprising the reaction products of:

(a) a triglyceride of a saturated or unsaturated $C_{12}$ to $C_{25}$ hydroxy-substituted fatty acid or a $C_{12}$ to $C_{25}$ hydroxy-substituted fatty acid (or Group HA metal salt thereof) and glycerol, which can react together to produce a triglyceride; and (b) at least 0.1 mole (and preferably up to 2.0 mole), per mole of triglyceride (a) triglyceride capable of being formed from the fatty acid and the glycerol, of an oxide, hydroxide or carbonate of a metal from Group IIA of the periodic table, i.e. fatty acid salts of the metal and glycerates of the metal (and optionally free fatty acid and glycerol), or a like mixture of fatty acid salts of the metal and glycerates of the metal (and optionally free fatty acid and glycerol produced other than by reaction of reactants (a) and (b)).

The fatty acid is preferably an unsaturated fatty acid with one or more hydroxy groups present in the aliphatic chain.

According to a third aspect of the invention there is provided a composition for forming a polyurethane resin and comprising a composition according to the first or second aspect of the invention and a polyisocyanate.

It has been found that such compositions, according to the third aspect of the invention, will cure in the presence of water, even when submerged, to a high strength and will exhibit a firm bond when applied to wet surfaces such as steel, cast-iron or concrete, with no deleterious effect from the presence of water.

Thus by means of the present invention, there can be provided two-part polyurethane compositions which are water tolerant, cure to a high strength and do not require the use of water or organic solvents within their formulations.

DETAILED DESCRIPTION OF THE PREFERRED EMBODIMENT

The triglyceride is preferably provided by castor oil, i.e.: the composition according to the first aspect of the invention preferably comprises castor oil.

Castor oil has as its main component (about 80%) the triglyceride of ricinoleic acid. Each ricinoleic side chain has a hydroxy group on the ninth carbon atom and for this reason castor oil has frequently been used as a low cost polyol in polyurethane compositions, although it tends to introduce flexibility, which may not be desired. We have found that castor oil, when hydrolyzed by an oxide, hydroxide or carbonate of a metal from group IIA of the Periodic Table, produces a mixture of long-chain hydroxy-containing salts of the metal and the glycerate of the metal.

The castor oil may be "first pressing" material, pharmaceutical grade commercial or second grade. The oil should preferably conform to BS650 1967 but this is not essential.

The metal oxide, hydroxide or carbonate is preferably a hydroxide of an alkaline earth metal such as calcium, strontium or barium. Basic carbonates such as magnesium carbonate may also be used.

The preferred component (b) is calcium hydroxide. When reacted with castor oil this produces calcium ricinoleate, a difunctional polyol, and calcium glyceride, a tetrafunctional polyol. The reaction proceeds in two stages: in the first stage the oil is hydrolyzed to ricinoleic acid and glycerol, these then react with the calcium hydroxide producing water molecules as well as the calcium salts (calcium ricinoleate and calcium glycerate). The calcium salts produced have been found to produce polymers (i.e. polyurethane resins) with very useful properties when further reacted by combination with polyisocyanates.

The content of the calcium salts may be controlled by varying the starting amount of calcium hydroxide employed and stopping the reaction when a desired content of the calcium salts has been reached by adding sufficient calcium oxide to react with the water produced and any water which may have been present in the initial components. To afford improved water tolerance, further calcium hydroxide (over and above the at least 0.1 mole, per mole of triglyceride previously referred to) may then be added and no further hydrolysis or reaction will occur provided sufficient calcium oxide is present to remove any water present in the additional calcium hydroxide.

The following table illustrates the range of physical properties that can be achieved by way of measurements of flexural strengths measured on the polymers formed by reacting the partially or fully reacted castor oil with the calculated stoichiometric amount of 4,4-diphenylmethanediisocyanate (M.D.I.). The proportion of calcium hydroxide quoted is the percentage of the stoichiometric quantity required to react fully with the hydrolysis products from the castor oil. 100% corresponds to 2 moles of calcium hydroxide per mole of triglyceride, i.e. the stoichiometric amount of calcium hydroxide to react fully with the hydrolysis products from the castor oil.

| % calcium hydroxide | Flexural strength (Newtons/mm.Sq.) | Flexural modulus (Newtons/mm.Sq.) |
| --- | --- | --- |
| 5 | 15 | 102 |
| 10 | 22 | 185 |
| 20 | 27 | 235 |
| 40 | 44 | 582 |
| 60 | 64 | 941 |
| 80 | 69 | 1176 |
| 100 | 73 | 1487 |

Further variations can be made by the inclusion of other non-hydrolyzable polyols, which may be difunctional, trifunctional, tetrafunctional or greater, with respect to the hydroxyl content. These may be chosen from the commercially available polyether polyols, derived from propylene glycol, ethylene glycol, trimethylol propane or bisphenols, and they may include polyols derived from hydroxy-containing polybutadienes, modified alkyd resins, oil soluble phenolic resins, epoxy resin/amine adducts, hydroxyl containing epoxy resins, sugars or low molecular weight polyols such as butane diol, mono propylene glycol, ethylene glycol and glycerol.

If the compositions according to the first and second aspects of the invention are made using a fatty acid and glycerol, then the fatty acid and glycerol may react directly with the oxide, hydroxide or carbonate of the Group IA metal without intermediate formation of triglyceride and hydrolysis thereof.

A practical composition according to the first aspect of the invention and comprising castor oil or other triglyceride and glycerol may comprise 0.1 to 0.5 mole of the oxide, hydroxide or carbonate per mole of the glycerol in conjunction with calcium salts of one or more of the fatty acids. Successful use of such a composition may require the presence of a further polyol to reduce viscosity and control reactivity.

The polyol composition of the invention may include other conventional materials depending on the intended use of the polyurethane. For example, when preparing a surface coating or sealant it may be desirable to include a particulate mineral filler such as talc, china clay, calcium carbonate, barium sulphate, silica or slate flour. Further additives may be included to control the rheology of the composition, for example clays, fumed silica or hydrogenated castor oil. As pigments, titanium dioxide or iron or chromium oxides or other suitable colorants may be included.

Where a surface coating composition needs to be provided with anti-corrosive properties, suitable anti-corrosive pigments or fillers may be included, for example micaceous iron oxides, zinc phosphate/borate combinations, basic aluminium/zinc phosphate, modified barium borate, modified barium metaborate, basic zinc molybdate, strontium phosphate hydrate, zinc silicophosphate hydrate, zinc molybdate phosphate, basic zinc phosphate hydrate or other materials used to inhibit corrosion of metallic surfaces.

For the production of a polyurethane suitable for use as a flooring composition there may be added, during manufacture or just prior to application, suitable graded granular materials such as silica sand, crushed flint, crushed marble, crushed granite, polyvinyl chloride flakes, wood flour, rubber crumb or other similar materials.

If it is desired to reduce the viscosity of the polyol composition, a solvent may be included provided it is free of hydroxyl groups or other forms of active hydrogen. Suitable solvents include toluene, xylene, methylene chloride, methyl ethyl ketone, methyl isobutyl ketone, acetone, methyl pyrrohidone, aliphatic or aromatic hydrocarbons, cyclohexane and ethyl acetate.

Isocyanates with which the polyol compositions of the invention may be reacted may be of any conventional type, including aliphatic, cycloaliphatic and araliphatic isocyanates. Among the polyisocyanates which can be used are tolylene diisocyanate (TDI), diphenyl methane diisocyanate (MDI), xylylene diisocyanate, isophorone diisocyanate, hexamethylene diisocyanate, trimethyl hexamethylene diisocyanate, 2,2,4- or 2,4,4-dicyclohexylmethyl diisocyanates, 3-isocyanatomethyl-3,5,5-trimethyl cyclohexyl isocyanate or any other liquid polyisocyanate material, including prepolymer formed by the reaction of an excess of any polyisocyanate with a suitable polyhydroxy compound or other isocyanate-reactive compound, such as hydroxvl terminated polyesters, hydroxyl terminated poiybutadiene glycol, amino alcohols, polyamines, higher polyhydric alcohols, water, polyesteramides, polyesters or any other suitable precursors.

The polyol composition is preferably reacted with slightly more polyisocyanate than is required to react completely with the available hydroxyl groups in the polyol composition. The stoichiometric excess is preferably from 10 to 20% but may be higher.

The invention will now be illustrated further by means of the following examples. It will be understood that the calcium hydroxide used in the examples contains water (about 2% by weight) as an impurity.

EXAMPLE 1

A flooring mortar was prepared from the following composition:

| PART A | |
| --- | --- |
| Castor oil | 31.6 wt parts |
| Calcium hydroxide | 1.7 wt parts |
| Calcium oxide | 2.7 wt parts |
| PART B | |
| Isophorone diisocyanate | 10.0 wt parts |
| PART C | |
| Dried silica sand | 120.0 wt parts |

Parts A and B are mixed together at ambient temperature and Part C is mixed with the resulting mixture to produce the mortar, which cures to a polyurethane resin having a flexural strength of 20 N/mm. Sq. and a flexural modulus of 1,800 N/mm.Sq.

EXAMPLE 2

A flexible sealing material was prepared from the following composition:

| PART A | |
| --- | --- |
| Castor oil | 45 wt parts |
| Polybutadiene polyol M.wt. 2800 | 30 wt parts |
| Calcium hydroxide | 2.2 wt parts |
| Calcium oxide | 3.3 wt parts |

| PART B | |
| --- | --- |
| 2,4,4-trimethyl hexamethylene diisocyanate | 11.0 wt parts |

Parts A and B are mixed together at ambient temperature to produce a mixture which cures to form a flexible polyurethane resin having a flexural strength of 25 N/mm.Sq. and an elongation at break of 120%.

EXAMPLE 3

A water-tolerant surface coating was prepared from the following composition.

| PART A | |
| --- | --- |
| Castor oil | 32.0 wt parts |
| Calcium hydroxide | 8.0 wt parts |
| Calcium oxide | 5.0 wt parts |
| PART B | |
| Diphenylmethane diisocyanate (MDI) | 20.0 wt parts |

Parts A and B are mixed together at ambient temperature to form a mixture which cures to produce a polyurethane resin having a flexural strength of 45 N/mm.Sq. and a modulus of 1,500 N/mm.Sq.

While specific embodiments of the invention have been shown and described in detail to illustrate the application of the principles of the invention, it will be understood that the invention may be embodied otherwise without departing from such principles.

What is claimed is:

1. A method of forming a resin composition for forming a polyurethane resin, comprising:
    preparing a polyol composition comprising:
        reacting together:
            (a) a triglyceride of a $C_{12}$ to $C_{25}$ hydroxy-substituted fatty acid; and
            (b) calcium hydroxide to hydrolyze the triglyceride to yield a fatty acid in free form and glycerol; and
        saponifying the fatty acid to give a fatty acid salt,
        the calcium hydroxide being provided in an amount of at least 0.1 mole per mole of the triglyceride; and
    combining the polyol composition with a polyisocyanate to form the resin composition.

2. The method according to claim 1, wherein water produced by the saponifying is removed by reaction with calcium oxide.

3. A composition for forming a polyurethane resin comprising:
    a polyol composition and polyisocyanate,
    the polyol composition having been prepared by
        reacting together:
            (a) a triglyceride of a $C_{12}$ to $C_{25}$ hydroxy-substituted fatty acid: and
            (b) calcium hydroxide to hydrolyze the triglyceride to yield a fatty acid in free form and glycerol; and
        saponifying the fatty acid to give a fatty acid salt,
        the calcium hydroxide being provided in an amount of at least 0.1 mole per mole of the triglyceride.

4. The composition of claim 3, wherein the hydroxy-substituted fatty acid is an unsaturated fatty acid.

5. The composition of claim 3, wherein the hydroxy-substituted fatty acid is ricinoleic acid.

6. The composition of claim 5, wherein the triglyceride of ricinoleic acid is provided by castor oil.

7. A polyurethane resin formed by
    reacting a polyol composition with a polyisocyanate,
    the polyol composition having been prepared by reacting together:
        (a) a triglyceride of a $C_{12}$ to $C_{25}$ hydroxy-substituted fatty acid; and
        (b) calcium hydroxide to hydrolyze the triglyceride to yield a fatty acid in free form and glycerol; and
    saponifying the fatty acid to give a fatty acid salt,
    the calcium hydroxide being provided in an amount of at least 0.1 mole per mole of the triglyceride.

8. The polyurethane resin according to claim 7, wherein water produced by saponifying the fatty acid is removed by reaction with calcium oxide.

9. The polyurethane resin according to claim 7, wherein the hydroxy-substituted fatty acid is an unsaturated fatty acid.

10. A polyurethane resin according to claim 7, wherein the hydroxy-substituted fatty acid is ricinoleic acid.

11. A polyurethane resin according to claim 7, wherein the triglyceride of ricinoleic acid is provided by castor oil.

12. The composition claim 3, wherein water produced by saponifying the fatty acid is removed by reaction with calcium oxide.

* * * * *